United States Patent [19]

Muk Kim

[11] Patent Number: 5,090,149
[45] Date of Patent: Feb. 25, 1992

[54] DECORATED PIPE FOR FISHING ROD AND METHOD FOR MAKING SAME

[76] Inventor: Young Muk Kim, 512-1 Gamchean-dong, Sana-ku, Pusan, Rep. of Korea

[21] Appl. No.: 528,601

[22] Filed: May 25, 1990

[30] Foreign Application Priority Data

Jul. 4, 1989 [KR] Rep. of Korea .................. 89-9844

[51] Int. Cl.⁵ .............................................. A01K 87/00
[52] U.S. Cl. ................................................... 43/18.1
[58] Field of Search ............... 43/18.1; 156/193, 195, 156/172, 215, 280; 29/460; 493/297, 298, 299, 273, 300, 301; 2/246; 8/445

[56] References Cited

U.S. PATENT DOCUMENTS

| | | | |
|---|---|---|---|
| 15,959 | 10/1856 | Derby | 8/446 |
| 270,371 | 1/1883 | Batonnier | 8/446 |
| 371,204 | 11/1887 | Mansfield | 43/18.1 |
| 638,819 | 12/1899 | Stimpson | 8/446 |
| 780,636 | 1/1905 | Cadgene | 8/446 |
| 1,063,529 | 6/1913 | Giles | 8/446 |
| 2,075,480 | 3/1937 | Taylor | 8/445 |
| 2,186,176 | 1/1940 | Robinson et al. | 8/445 |
| 2,222,582 | 11/1940 | Jenett | 8/445 |
| 2,797,731 | 7/1957 | Carlson, Jr. | 156/215 |
| 2,901,311 | 8/1959 | Bartl et al. | 8/445 |
| 3,468,694 | 9/1969 | Moritz et al. | 8/446 |
| 4,287,244 | 9/1981 | McMahon, Jr. | 493/297 |
| 4,304,620 | 12/1981 | Ashby et al. | 43/18.1 |
| 4,557,031 | 12/1985 | Winkler | 29/460 |
| 4,808,191 | 2/1989 | Gregory et al. | 8/445 |

FOREIGN PATENT DOCUMENTS 0001856 of 1892 United Kingdom ................. 43/18.1

OTHER PUBLICATIONS

"Fairchilds' Dictionary of Texiles", 1975, p. 457.

*Primary Examiner*—Richard K. Seidel
*Assistant Examiner*—Chuck Y. Mah
*Attorney, Agent, or Firm*—Sandler, Greenblum & Bernstein

[57] ABSTRACT

A pipe for a fishing rod comprising a pipe having an outer surface, and a flexible rectangular wrapper positioned about the outer surface of the pipe with a predetermined design thereon and covered with a transparent preservative coating; and a method for making same.

19 Claims, 1 Drawing Sheet

U.S. Patent
Feb. 25, 1992
5,090,149
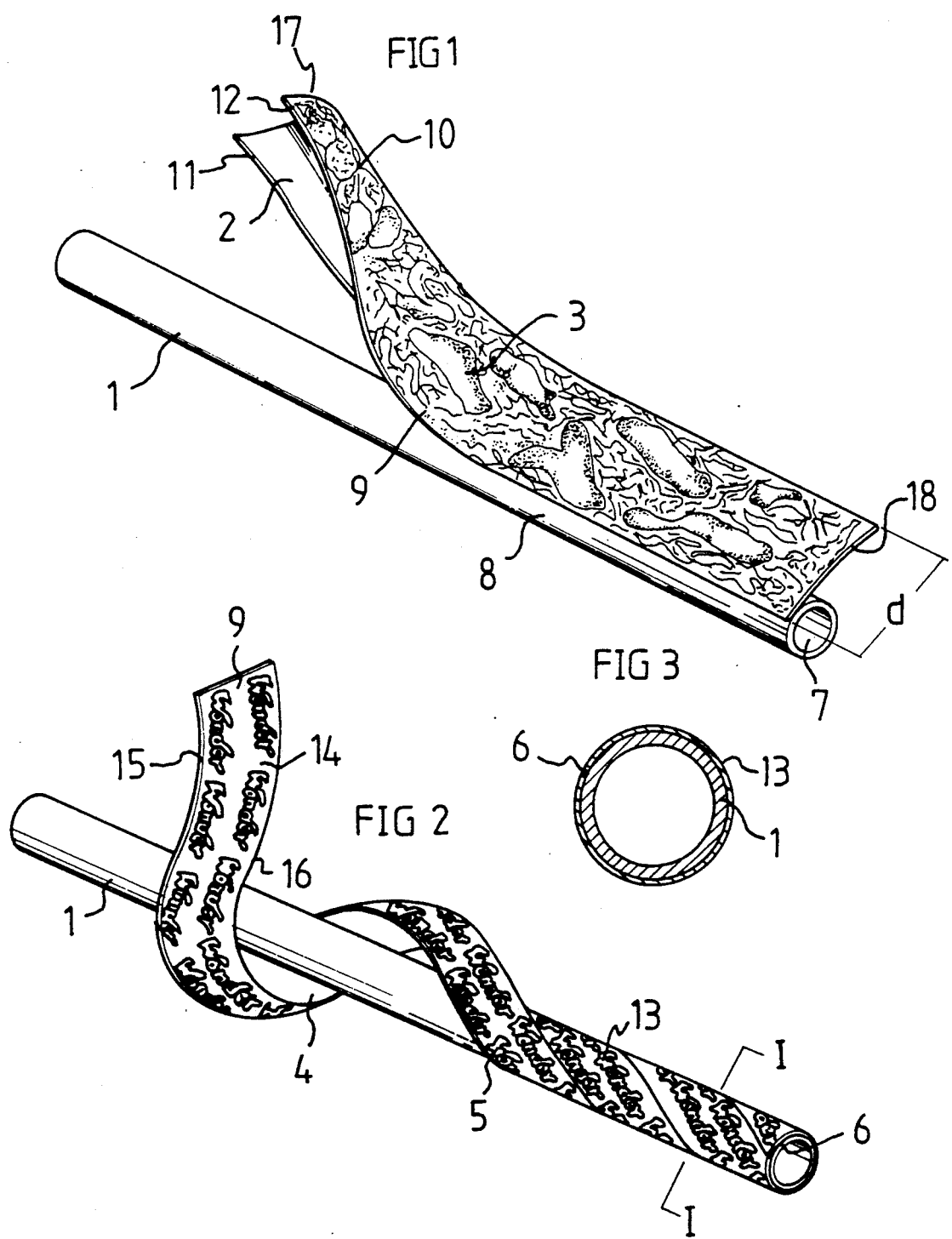

DECORATED PIPE FOR FISHING ROD AND METHOD FOR MAKING SAME

BACKGROUND OF THE INVENTION

1) Field of the Invention

The present invention is directed to fishing rods and methods of making them. More specifically, the present invention is directed to a decorated fishing rod, having an inner and an outer surface, with the outer surface having an affixed wrapper with a predetermined design thereon and a transparent preservative coating; and to a method of making the same.

2) Description Of Background And Relevant Materials

Fishing rods which have been used previously are made using a cylindrical carbon fiber rod or pipe (or section thereof) swathed in fiberglass which is then covered by winding nylon thread around the fiberglass. One flaw in the above rods, and method of making them, is that the rods are uniform in color and have not been able to effectively present designs or pictures on the surface of the rod. This normally occurs due to the inability of the nylon threads being wrapped around the rod to be colored in a manner such that a design will be evident once the thread has been wound around the pipe.

SUMMARY OF THE INVENTION

One object of the instant invention is to provide fishing rods, and a method of making them, which carry predetermined colors and designs, including but not limited to pictures, landscapes and logos, which are protected by a preservative coating which allows the design on the rod to be viewed.

Another feature of the invention is to provide a pipe for a fishing rod having a tubular rod with an inner surface and an outer surface, and a flexible rectangular wrapper positioned about the outer surface of the pipe with a predetermined design thereon and covered with a transparent preservative coating.

It is a further aspect of the invention that the wrapper is made of woven fibers with a predetermined design on it. As an additional aspect, the predetermined design is dyed on the woven fiber wrapper. A yet further aspect of the invention is that the woven fiber wrapper is made of nylon, polyester, carbon or fiberglass.

A further aspect of the invention is that the woven fiber wrapper is wound around the outer surface in such a manner that opposite longitudinal edges of the wrapper abut along a single longitudinal axis of the pipe. Alternatively, the woven fiber wrapper is wound around the outer surface in a spiral fashion so that the opposite ends of the wrapper abut.

A further aspect of the invention, which is an alternative to having a woven fiber wrapper, is a non-woven polymer wrapper. A yet further aspect of the non-woven polymer wrapper is wherein the wrapper is wound around the outer surface in such a manner that opposite longitudinal edges of the wrapper abut along a single longitudinal axis of the pipe. Alternatively, the non-woven polymer wrapper is wound around the outer surface in a spiral fashion so that the opposite longitudinal edges of the wrapper abut.

Further aspects of the invention involve a wrapper which is affixed to the outer surface of the pipe; the wrapper covers the entire outer surface of the pipe; and a transparent preservative coating can be paint, varnish, lacquer, shellac or polyurethane.

The invention also involves a method of applying a design to a pipe for a fishing rod having a flexible rectangular wrapper positioned about the outer surface of the pipe with a predetermined design thereon and covered with a transparent preservative coating which has the following steps:

a) obtaining a flexible rectangular wrapping having predetermined designs on it;

b) obtaining a pipe for the fishing rod;

c) applying the wrapper to the outer surface of the pipe;

d) affixing the wrapper thereon; and e) covering the pipe with a liquid transparent preservative coating.

Another aspect of the invention involves applying predetermined designs to the wrapper with a dye as well as dying the wrapper before applying it to the pipe.

BRIEF DESCRIPTION OF THE DRAWINGS

The invention is further explained in the description which follows, with reference to the drawings illustrating, by way of a non-limiting example, several embodiments of the invention wherein:

FIG. 1 is a perspective view of a pipe for a fishing rod, showing a wrapper according to one embodiment.

FIG. 2 is a perspective view of another embodiment of the pipe for a fishing rod wherein a wrapper is wrapped around a pipe in a spiral fashion.

FIG. 3 is a cross-section view, taken through line I—I, of a wrapped pipe showing a pipe for a fishing rod, a wrapper and the abutting joint of the wrapper.

DETAILED DESCRIPTION OF INVENTION

Referring now to the drawings in detail and for illustrative purposes only, FIG. 1 shows a preferred embodiment of the invention. This figure shows a cylinder 1, having an inner surface 7 and an outer surface 8, in a prewrapped state. The flexible wrapper 9, to be applied to cylinder 1, is substantially rectangular in shape and has an inner surface 2 and an outer surface 10. It is preferred by the Applicant that, in this embodiment, the wrapper 9 is comprised of a woven fiber such as nylon or polyester. As shown in FIG. 1, the outer surface 10 of the wrapper 9 carries a predetermined design 3 which in this preferred embodiment displays pictures of fish which are dyed on the wrapper.

In FIG. 1, the wrapper 9, having diameter d is positioned to be wrapped around the outer surface 8 of cylinder 1 in such a manner that the opposite longitudinal edges 11 and 12 of the wrapper 9 abut along a single longitudinal axis of cylinder 1. For this purpose Applicant prefers to position cylinder 1 perpendicular to the lateral edges 17 and 18 of wrapper 9. Wrapper 9 can then be taken around cylinder 1 until the longitudinal edges 15 and 16 meet. The inner surface 2 of wrapper 9 would then be affixed to the outer surface 8 of cylinder 1 and coated with transparent preservative coating.

FIG. 2 shows an embodiment similar to FIG. 1, but modified in that the wrapper 13 is already partially wrapped around the cylinder 1 and the wrapping is performed in a different manner. Flexible wrapper 13 is substantially rectangular in shape and has an inner surface 4 and an outer surface 14. In this embodiment, the flexible wrapper 13 is wound around the outer surface 8 of cylinder 1 in a spiral fashion as shown in FIG. 2.

In FIG. 2 the longitudinal edges 15 and 16 abut at joint 6.

The outer surface 14 of flexible wrapper 13 carries a predetermined design 5 which in the preferred embodiment of FIG. 2 is a logo design. The inner surface 4 of wrapper 13 is affixed to outer surface 8 of cylinder 1.

FIG. 3 shows a cross-section of FIG. 2 taken through line I—I. Cylinder 1 is covered by a flexible wrapper 13 whose longitudinal edges 15 and 16 abut at joint 6. This figure shows that wrapper 13 is applied to cylinder 1 such that there is no air space between them. Joint 6 of the figure shows the edges 15 and 16 abutting. In other embodiments these edges may overlap or not meet at all, depending upon the design chosen.

In a preferred embodiment of the invention, a tubular pipe for a fishing rod is used which has an inner surface and an outer surface. A flexible wrapper, of substantially rectangular shape, is positioned on the outer surface of the pipe. Substantially rectangular is herein defined as a plane with four sides.

The wrapper has an inner surface and an outer surface. The outer surface of the wrapper displays a design. The wrapped pipe is covered with a transparent preservative coating. In a preferred embodiment, the design is dyed onto the wrapper. Also, in this embodiment, the circumference of the tubular pipe can vary along its length. It is particularly preferred that the circumference gradually decrease from one end to the other.

In a similar embodiment, the wrapper is made of woven fibers. These fibers can be nylon, polyester carbon or fiberglass, or a combination of these materials. The Applicant particularly prefers nylon or polyester. In this embodiment, the cylinder is covered with the wrapper having a landscape design thereon and then covered with transparent paint. While the invention is not to be limited to a specific, transparent predervative coating, exemplary materials include paint, varnish, lacquer, shellac, polyurethane or other known materials.

Alternatively, the flexible wrapper may be comprised of a nonwoven polymer with a design printed thereon.

The wrapper may be applied to the pipe in several ways. On one embodiment, the wrapper is wound around the cylinder in a spiral fashion with the edges overlapping. In an alternative embodiment, the edges of the wrapper do not abut or overlap; instead a space separates the edges in which the cylinder can be seen, thus creating a "candy cane" design. Alternatively, the wrapper may be applied as a substantially rectangular wrapper to the surface of the cylinder so that the opposite longitudinal edges of the wrapper abut along a single longitudinal axis of the cylinder. It is preferred, in this embodiment, that the wrapper cover the entire outer surface of the pipe. The pipe or cylinder may vary in circumference along its length.

The method of practicing the invention consists of five basic steps. The first step involves obtaining a flexible substantially rectangular wrapper having designs on it. The designs on the wrapper may be dyed on or otherwise applied to the wrapper. The second step involves obtaining a pipe for the fishing rod. This pipe may be a solid cylinder or a hollow tube. In the preferred embodiment, the pipe obtained is a hollow tube with an inner and an outer surface.

Applying the flexible wrapper to the outer surface of the pipe is the third step. In a preferred embodiment, this includes aligning the pipe so that it is perpendicular to the lateral edges of the wrapper. Next the wrapper is wrapped around the pipe so that the longitudinal edges of the wrapper abut along a single longitudinal axis.

In the fourth step, the wrapper's inner surface is affixed to the outer surface of the pipe. This fixation may be performed using any means known in the art, including, but not limited to, gluing, heat, shrinking, etc.

The final step involves coating the wrapped pipe with a transparent liquid preservative. This may be accomplished using known means for applying paint such as dipping, spraying or brushing on the preservative. The preservative used then dries leaving a transparent protective coat on the wrapper through which the design can be viewed.

Another preferred method utilizes a wrapper of nonwoven polymer, and differs from the above five steps in winding the wrapper around the outer surface in a spiral fashion so that the longitudinal edges abut and trimming the ends so that they are even with the end of the pipe.

Applicant particularly prefers the method involving forming the wrapper from woven fibers by known weaving means and applying predetermined designs to the wrapper with known dyeing means, before the wrapper is applied to the pipe. These steps are followed by applying the wrapper to the pipe using the previously described spiral winding means and affixing the wrapper thereon. In this method, Applicant prefers coating the wrapped pipe with polyurethane.

Applicant emphasizes that the above embodiments and methods are specific examples of the invention claimed and that other embodiments and methods within the limits claimed are possible.

What is claimed is:

1. A pipe for a fishing rod comprising a tubular rod having an inner surface and an outer surface, and a flexible rectangular wrapper positioned about the outer surface of the pipe with a predetermined design thereon and covered with a transparent preservative coating, wherein the wrapper comprises woven fibers with a predetermined design thereon.

2. The pipe of claim 1, wherein the predetermined design is dyed on the woven fiber wrapper.

3. The pipe of claim 2, wherein said woven fiber wrapper comprises nylon, polyester, carbon or fiberglass, or a combination thereof.

4. The pipe of claim 1, wherein said wrapper is wound around the outer surface in such a manner that opposite longitudinal edges of the wrapper abut along a single longitudinal axis of the pipe.

5. The pipe of claim 1, wherein said wrapper is wound around the outer surface in a spiral fashion so that the opposite ends of the wrapper abut.

6. The pipe of claim 1, wherein said wrapper is wound around the outer surface in such a manner that opposite longitudinal edges of the wrapper abut along a single longitudinal axis of the pipe.

7. The pipe of claim 1, wherein said wrapper is wound around the outer surface in a spiral fashion so that the opposite longitudinal edges of the wrapper abut.

8. The pipe of claim 1, wherein the wrapper is affixed to the outer surface of the pipe.

9. The pipe of claim 1, wherein said wrapper covers the entire outer surface of the rod.

10. The pipe of claim 1, wherein the transparent preservative coating comprises paint, varnish, lacquer, shellac or polyurethane.

11. A pipe for a fishing rod comprising a cylindrical rod having an outer surface, and a woven fiber rectangular wrapper having various designs dye-treated upon it and wherein the woven fiber is wound around the outer surface of the pipe and covered with transparent paint.

12. A method of applying a design to a pipe for a fishing rod having a flexible rectangular wrapper positioned about the outer surface of the pipe with a predetermined design thereon and covered with a transparent preservative coating which comprises:
 a) obtaining a flexible substantially rectangular wrapper having predetermined designs thereon said wrapper formed from woven fibers;
 b) obtaining a pipe for the fishing rod;
 c) applying said wrapper to the outer surface of the pipe;
 d) affixing said wrapper thereon; and
 e) covering the pipe with a liquid transparent preservative coating.

13. The method of claim 12, wherein said wrapper covers the entire outer surface of the rod.

14. The method of claim 12, further comprising applying said predetermined designs to the wrapper with a dye.

15. The method of claim 14, further comprising dyeing the wrapper before applying it to the pipe.

16. The method of claim 12, further comprising winding the wrapper around the outer surface in such a manner that opposite longitudinal edges of the wrapper abut along a longitudinal axis of the pipe.

17. The method of claim 12, further comprising winding the wrapper around the outer surface in a spiral fashion and trimming the ends.

18. The method of claim 12, further comprising applying a transparent preservative coating chosen from the group consisting of paint, varnish, lacquer, shellac and polyurethane.

19. A pipe for a fishing rod made by the process of claim 12.

* * * * *

UNITED STATES PATENT AND TRADEMARK OFFICE
CERTIFICATE OF CORRECTION

PATENT NO. : 5,090,149
DATED : February 25, 1992
INVENTOR(S) : Young MUK KIM

It is certified that error appears in the above-indentified patent and that said Letters Patent is hereby corrected as shown below:

On the cover page, section [56] in Foreign Patents, "of 1892" to -- -11/1892---.

Signed and Sealed this

Third Day of January, 1995

BRUCE LEHMAN

Attest:

*Attesting Officer*  *Commissioner of Patents and Trademarks*